United States Patent [19]

Dyke et al.

[11] Patent Number: 4,949,355
[45] Date of Patent: Aug. 14, 1990

[54] TEST ACCESS SYSTEM FOR A DIGITAL LOOP CARRIER SYSTEM

[75] Inventors: Harry J. Dyke, Oak Forest; Donald E. Koch, Aurora, both of Ill.

[73] Assignee: Rockwell International Corporation, El Segundo, Calif.

[21] Appl. No.: 300,451

[22] Filed: Jan. 23, 1989

[51] Int. Cl.⁵ .............................................. H04L 12/26
[52] U.S. Cl. ........................................ 375/10; 370/13
[58] Field of Search ...................... 375/10; 370/13, 14, 370/17; 379/1, 8, 10, 12, 22, 24; 371/15, 22; 340/825.16

[56] References Cited

U.S. PATENT DOCUMENTS 4,561,090 12/1985 Turner .................................. 370/13
4,712,209 12/1987 Kuritani et al. ..................... 370/13

Primary Examiner—Benedict V. Safourek
Attorney, Agent, or Firm—C. B. Patti; V. L. Sewell; H. F. Hamann

[57] ABSTRACT

The test access system of the present invention is for use in a digital loop carrier communication system having at least first and second terminals connected by a digital transmission line. Each of the first and second terminals has a plurality of analog ports for analog signals and at least one digital port connected to the digital transmission line for digital signals. Each of the first and second terminals also has a plurality of channel units having first ports connected to the analog ports, respectively, and at least one digital interface unit having a first port connected to the channel units and a second port connected to the digital port. The test access system has a channel diagnostic unit connected via a first bus to each of the analog ports and the first ports of the channel units and connected via a second bus to the first port of the digital interface unit. A system access unit is connected via the first bus to each of the analog ports and the first ports of the channel units and is connected via the second bus to the first port of the digital interface unit. The channel diagnostic unit at least tests a signal path and the system access unit at least provides for monitoring and/or insertion of test signals on the signal path.

15 Claims, 6 Drawing Sheets

TEST ACCESS SYSTEM FOR A DIGITAL LOOP CARRIER SYSTEM

BACKGROUND OF THE INVENTION

The present invention relates to a digital loop carrier system having a plurality of channel units in a telephone transmission system. The present invention in particular provides for a test access system for channel units and other components of the digital loop carrier system.

Pulse code modulated (PCM) multiplex systems are used in the digital loop carrier systems. The primary purpose of a PCM digital multiplex system is the conversion of voice frequency signals to digital signals using standard sampling and encoding techniques in the multiplexing of 23 additional digitized samples into a T1 serial transmission format. Within the format of the T1 serial bit stream are 24 eight byte locations commonly referred to as the time slots into which the encoded data can be placed. In a typical digital loop carrier system a central office terminal is connected to a remote terminal via a digital transmission line. A typical terminal may have two channel banks of channel units where in each channel bank contains four digroups of 24 channel units. Four digital interface units are used to connect the channel units to the digital transmission line. As is well known in the art the channel units and the digital interface units are computer controlled within the terminal, such as by a bank controller unit.

In general a terminal will receive and transmit analog telephone signals on one side and digital signals on an opposite side. In the prior art there has been a need for having the ability to test the channel units and the digital interface units, as well as other components, for proper operation.

In particular there has been no circuitry or devices available for testing different combinations of signal paths through a terminal or through both the connection from a central office terminal to a remote terminal. The present invention overcomes these drawbacks in the prior art.

SUMMARY OF THE INVENTION

It is an object of the present invention to provide an improved means for providing test access to channel units and digital interface units in a digital loop carrier system.

The test access system of the present invention is for use in a digital loop carrier communication system having at least first and second terminals connected by a digital transmission line. Each of the first and second terminals has a plurality of analog ports for analog signals and at least one digital port connected to the digital transmission line for digital signals. Each of the first and second terminals also has a plurality of channel units having first ports connected to the analog ports, respectively, and at least one digital interface unit having a first port connected to the channel units and a second port connected to the digital port. The test access system has a channel diagnostic unit connected via a first bus to each of the analog ports and the first ports of the channel units and connected via a second bus to the first port of the digital interface unit. A system access unit is connected via the first bus to each of the analog ports and the first ports of the channel units and is connected via the second bus to the first port of the digital interface unit. The channel diagnostic unit provides for testing the signal path and the system access unit at least provides for monitoring and/or insertion of test signals on the signal path.

BRIEF DESCRIPTION OF THE DRAWINGS

Features of the present invention which are believed to be novel, are set forth with particularity in the appended claims. The invention, together with further objects and advantages, may best be understood by reference to the following description taken in conjunction with the accompanying drawings, in the several figures in which like reference numerals identify like elements, and in which:

DESCRIPTION OF THE PREFERRED EMBODIMENT

Figure 1:
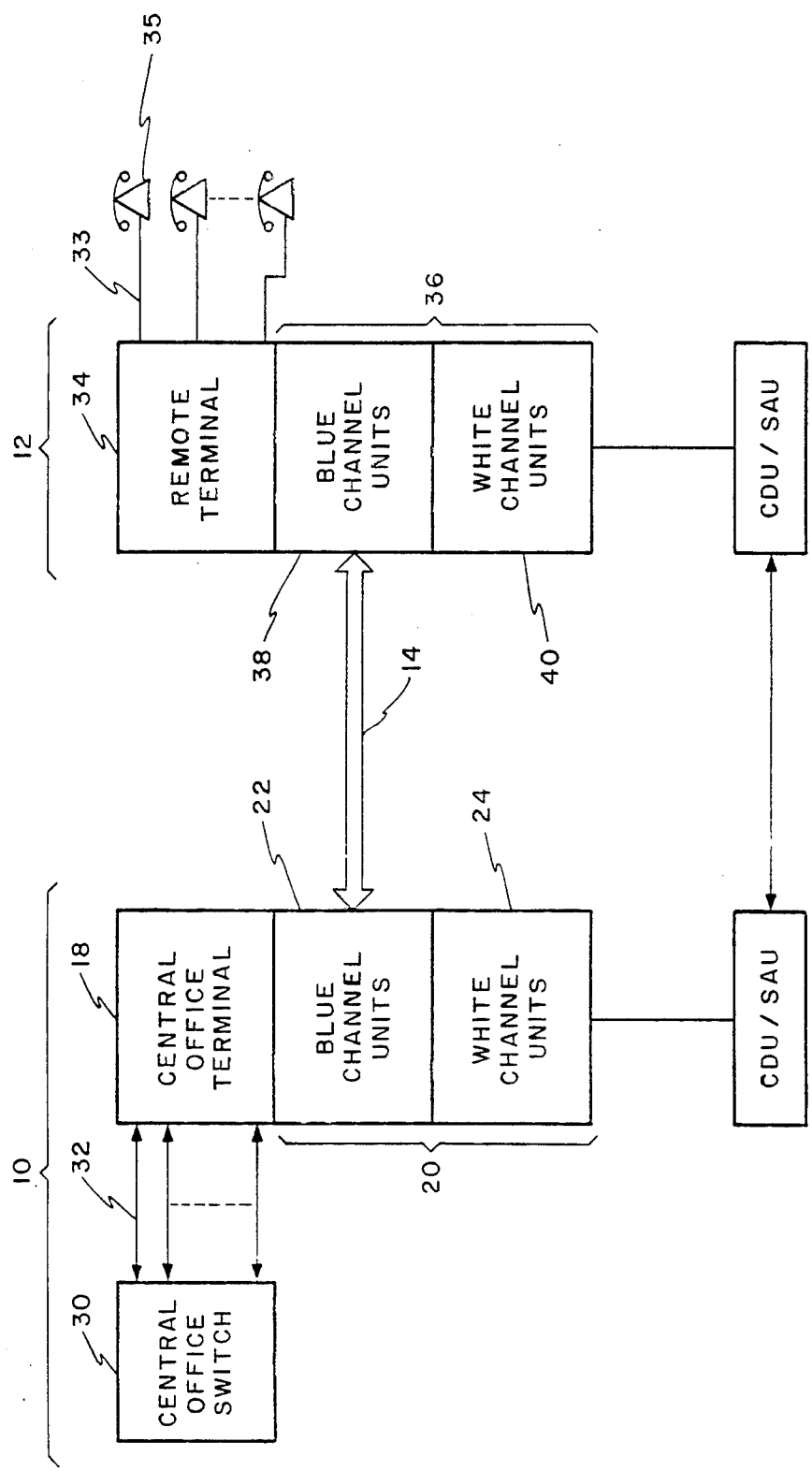
FIG. 1 is a general block diagram depicting a digital loop carrier system incorporating the present invention.

The present invention has general applicability but is most advantageously utilized in a digital loop carrier system of the type shown in FIG. 1.

As shown in FIG. 1, a central office location 10 is connected to a remote location 12 by a digital transmission line system 14. The transmission line system 14 is to be understood as having digital multipliers and digital lines between the central office terminal 18 and the remote terminal 34. In the central office 10 are located channel banks referred to as a central office terminal 18. The channel banks are composed of a plurality of channel units, such as blue channel system 22 and white channel system 24 in the central office location 10 and blue channel system 38 and white channel system 40 in the remote location 12. The references to "white" and "blue" channel systems are terminology adapted by Rockwell International for its equipment.

The central office 10 also has a central office switch 30 which is connected by leads 32 to the central office terminal 18. Central office switches which are known in the prior art may be utilized for the central office switch 30 shown in FIG. 1. The central office terminal 18 provides subscriber channels over outgoing digital line 14. Corresponding remote terminal 34 of the system separates the signals on the digital line 14 into a plurality of voice frequency analog signals on local drop wires 33 for delivery to a plurality of subscriber stations 35.

Figure 2:
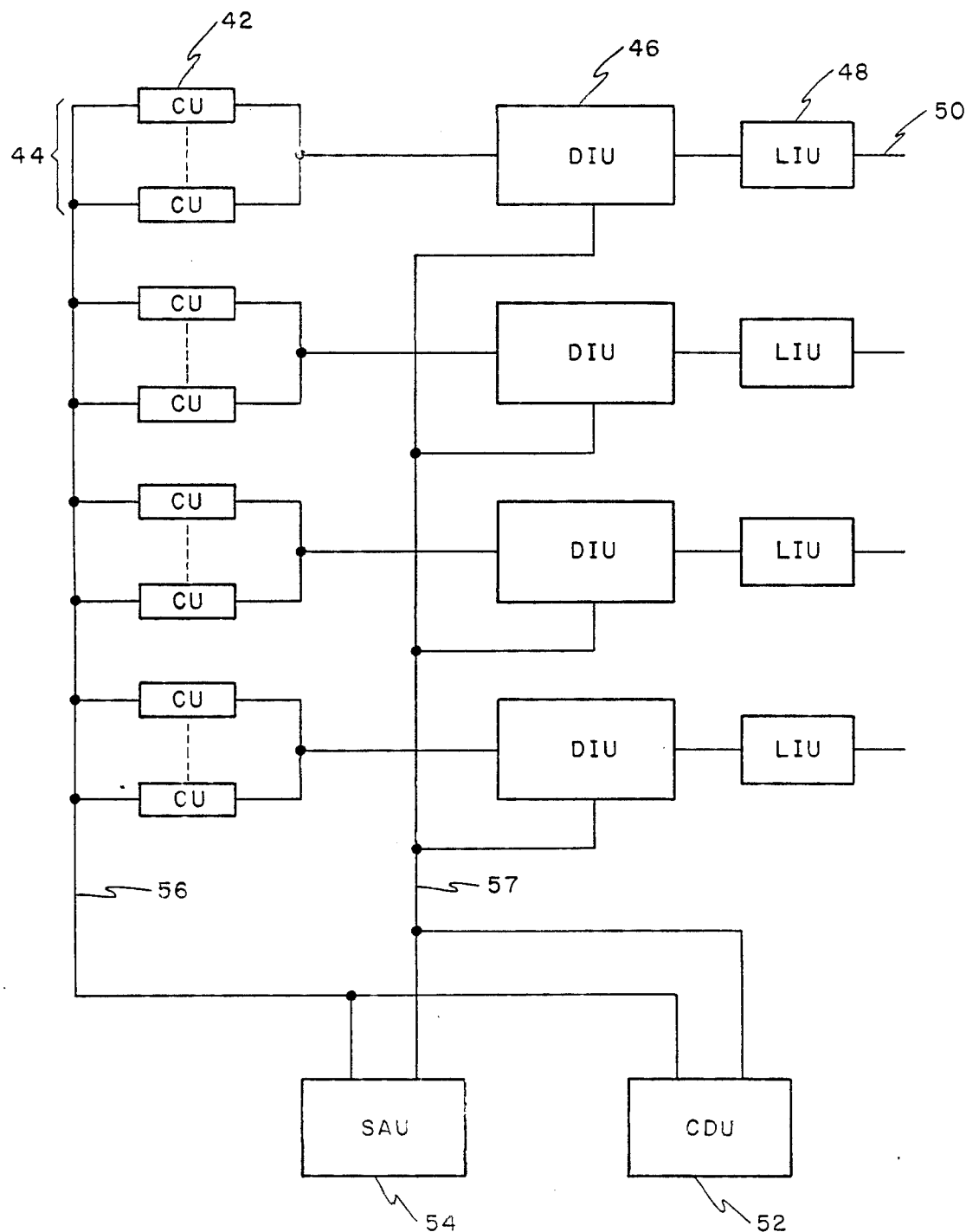
FIG. 2 is a general block diagram depicting the test access connections of channel units and digital interface units in a terminal.

Each of the blue and white systems 22, 24 and 38, 40 in the central office terminal 18 and the remote terminal 34 have 96 channel units (CU) 42 which are divided into four digroups 44 of 24 channel units each (see FIG. 2). A digroup interface unit (DIU) 46 multiplexes the 24 channel units 42 onto a line interface unit (LIU) 48. The LIU 48 is connected to a T1 line 50. The DIU 46 provides formatting, timing and multiplexing for the T1 line and the LIU 48 provides signal shaping and driving capability. In essence the DIU 46 corresponds to a first address and the channel unit 42 corresponds to a second address within the system. In the embodiment shown in FIG. 2 channel diagnostic unit (CDU) 52 selects an address of the DIU 46 and an address of the channel unit 42 in order to select a particular channel unit to be tested. Also included in the system is a system access unit (SAU) 54 via which signals occurring in the channel units 42 and the digital interface units 46 can be monitored or test signals can be inserted into the system.

As shown in FIG. 2 a bus 56 connects each of the channel units 42 to both the SAU 54 and CDU 52. Also each of the digital interface units 46 are also connected to the SAU 54 and the CDU 52 by a bus 57.

Also as shown in FIG. 1 of the drawings the CDU/SAU equipment 53 at the central office location 10 can be in communication with another CDU/SAU equipment 55 at the remote location 12. For example, each CDU/SAU equipment can be attached to a computer which via appropriate modems can establish communication over other telephone lines.

Figure 3:
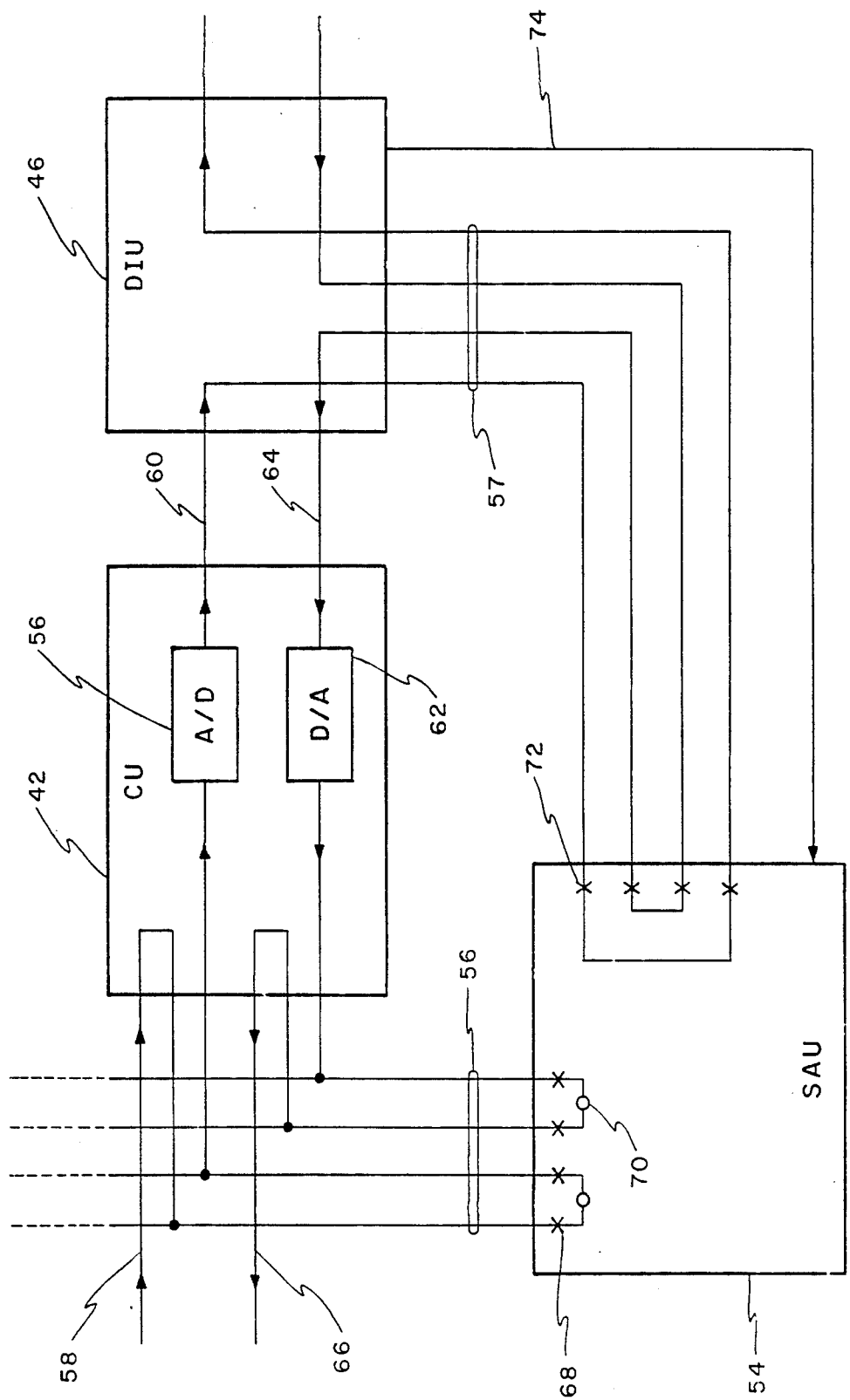
FIG. 3 is a more detailed diagram of the signal paths in a channel unit and digital interface unit of a terminal.

FIG. 3 shows in more detail the connection of the SAU 54 to a particular channel unit 42 and a digital interface unit 46. Bus 56 which connects the SAU 54 to the channel unit via relays on channel unit 42. Each of the other channel units can also connect to bus 56 via relays on each channel unit. The channel unit 42 has an analog to digital converter 56 for converting the analog voice frequency signals entering on line 58 to digital signals which are output on line 60 to the DIU 46 and a digital to analog converter 62 for converting digital signals on line 64 to an analog voice signal on line 66. The bus 56 establishes the connections as shown in FIG. 3 wherein relays or other switch means 68 are utilized to route the signal paths from lines 58 and 66 through the channel unit 42 to the SAU jacks 70. Jacks 70 provide access for monitoring or inserting signals onto the bus 56. Digital buses 60 and 64 are connected to bus 57 via switches on the DIU to Digital Access Circuitry in the SAU 54 as shown in FIG. 3. Digital signals of a particular channel unit can be monitored or inserted into the system via the digital test access circuit on the SAU. A line 74 connects the DIU 46 to the SAU 54 for supplying timing and synchronization signals for the digital signals.

Figure 4:
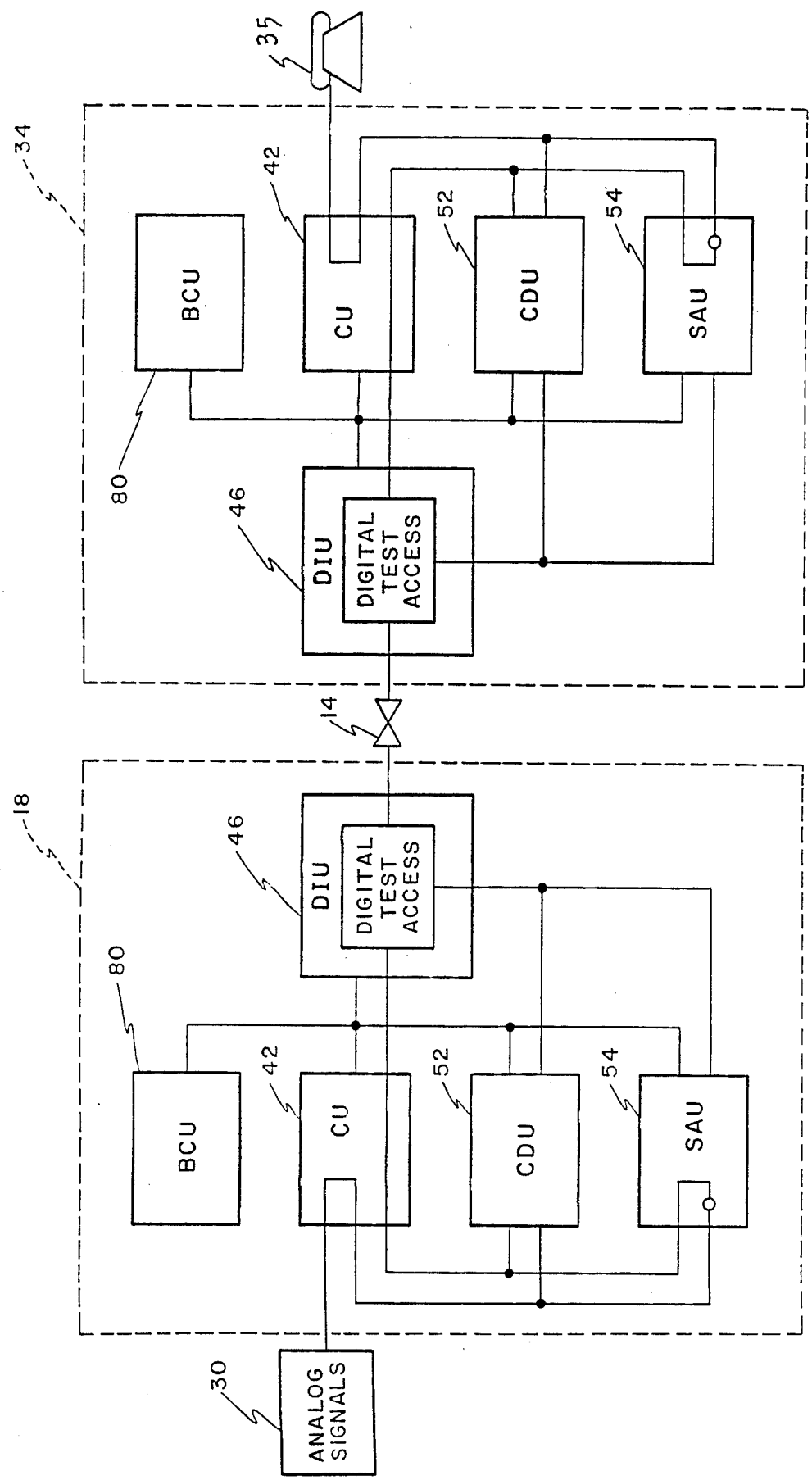
FIG. 4 is a more detailed block diagram showing the interconnection of a central office terminal with a remote terminal including test access connections.

FIG. 4 shows a digital carrier loop system in more detail for the central office terminal 18 and the remote terminal 34. The pertinent parts of the terminals are shown and comprise a bank control unit 80 which is connected to the channel unit 42, the CDU 52 and the SAU 54, as well as the DIU 46. The BCU provides the necessary communications and control to coordinate the test access system. A digital transmission line 14 connects the central office terminal 18 to the remote terminal 34. The remote terminal 34 contains corresponding equipment for the purposes of this discussion and is labeled with the same reference numerals.

Figure 5:
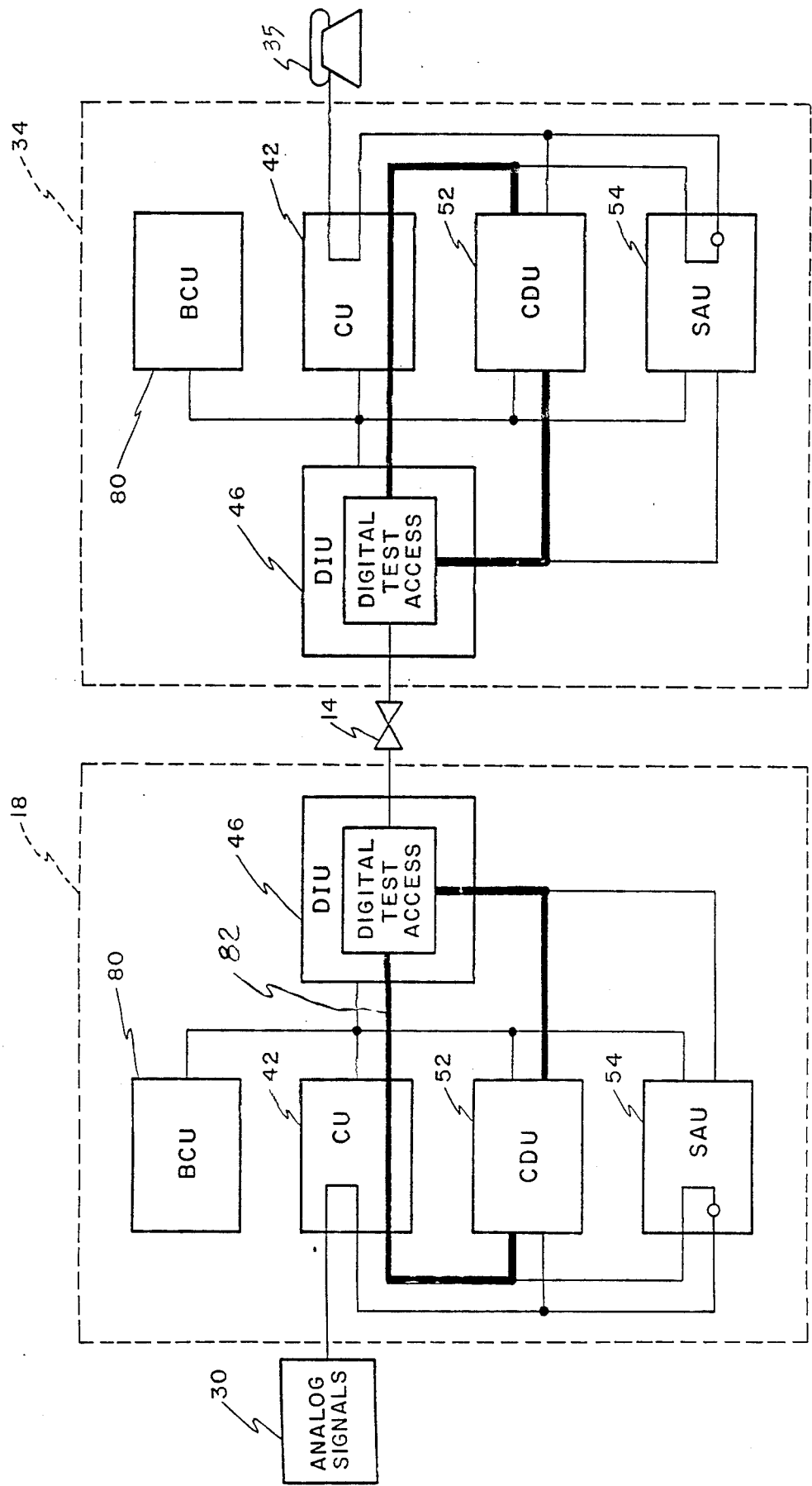
FIG. 5 depicts a testing of a channel unit in both a remote terminal and a central office terminal.

FIG. 5 depicts the path for testing a channel unit 42 in each of the central office terminal 18 and the remote terminal 34. The path 82 is depicted by the heavy line which goes through the channel unit 42 the digital interface unit 46 and the channel diagnostic unit 52.

Figure 6:
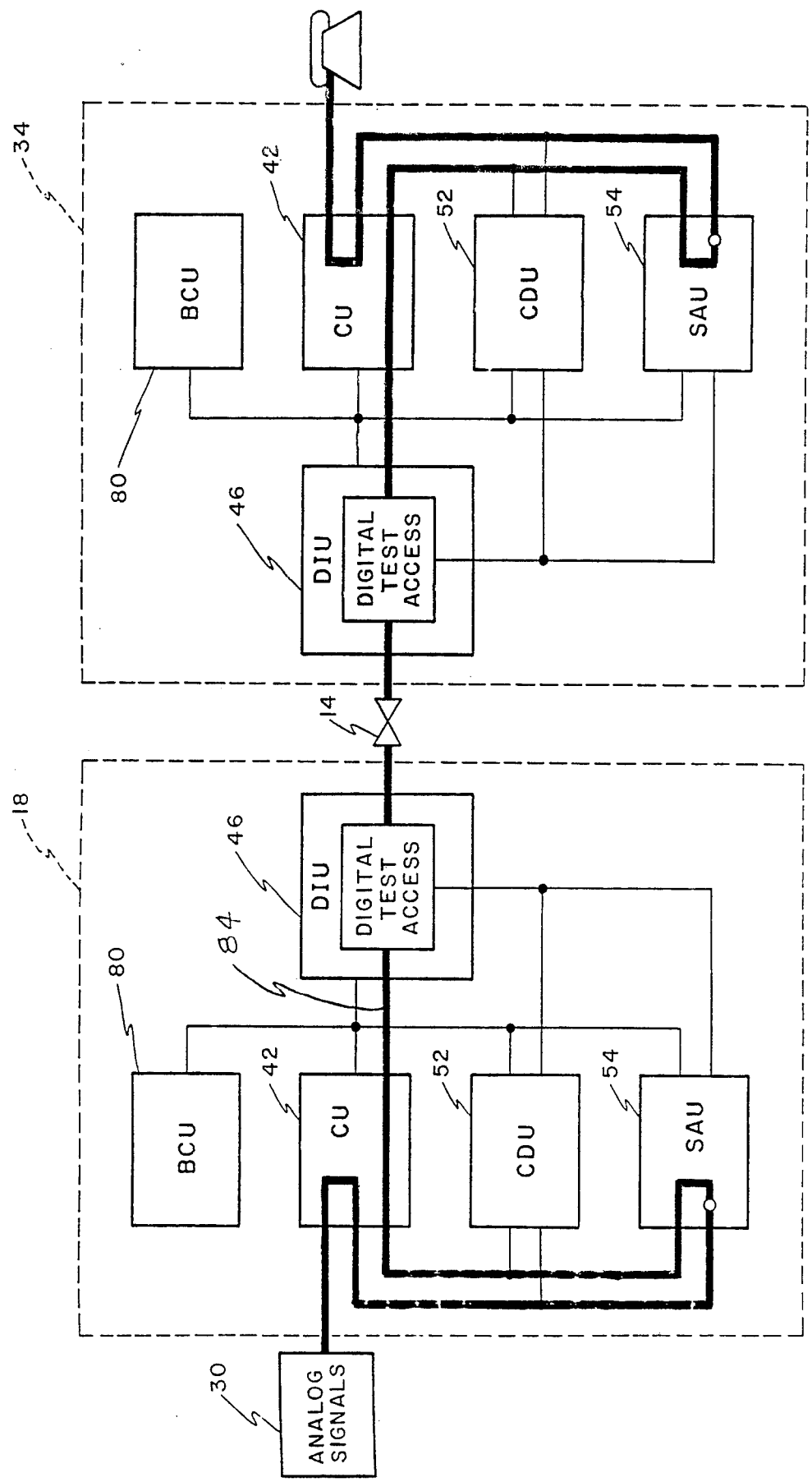
FIG. 6 depicts a signal test path for testing a digital loop carrier system for a central office terminal and a remote terminal utilizing the present invention.

FIG. 6 shows the path 84 for testing the system in both the central office terminal 18 and the remote terminal 34.

It has been found necessary with the development of digital loop carrier systems to provide test access to the individual channel units which are used in various ways to confirm operation of the channel units or the circuit. Since a channel unit is basically a module which converts an analog signal to a digital signal, a test access system was needed that could gain access both at the analog interface and the digital interface. With that access provided according to the present invention a test system generates analog signals and verifies the digital representation of those analog signals and the inverse, that is to generate a digital signal and verify the analog output.

The digital loop carrier system of the present invention provides this capability in the form of an analog or a voice frequency test bus 56 and a digital test bus 57 to which any channel unit can access. The particular capability allows various forms of monitoring and testing functions to be performed either locally or from a remote location. In addition, the digital access allows testing of both ends of a digital loop carrier system from one end in order to isolate problems to one end.

The present invention allows a hitless monitoring capability at the voice frequency interface as well as breaking or splitting access in both directions at the voice frequency interface. Also a loop back capability can be provided at the voice frequency interface. Similarly, a hitless monitor capability at the digital interface is provided as well as the ability to select one or multiple timeslots of the pulse code modulated signal at the digital interface. Full splitting access at the digital interface allows testing in either direction. A digital loopback of a channel unit can be provided at the digital interface. Independent testing of either the pulse code modulation (voice encoded data) or signaling (signalling encoded data) or both at the same time is possible. The features allow for the following types of testing: complete channel testing; extensive diagnostics on common equipment; fault isolation to a board level at one end of the system; complete circuit testing through the digital loop carrier system; testing of the remote end of the system; fault isolation to one end of the system channel unit testing at remote terminal from COT terminal, testing of the subscriber drop, and the ability to pass test access to a remote test system.

As can be seen in FIG. 3 with the ability to make and break line connections at the SAU on bus 56 and bus 57, numerous combinations of inserting test tones into the system both from an analog side or the digital side, as well as monitoring the signals flowing through the system at both the digital and analog sides are possible. Furthermore the digital signals can be sent either back to the channel unit 42 or through the digital interface unit 46 out onto the transmission line 14. It is also possible as shown in FIGS. 4, 5 and 6 to provide various combinations of testing between a central office terminal 18 and a remote terminal 34. Also given the option as shown in FIG. 1 of providing the CDU/SAU equipment with the ability to communicate with each other provides further combinations of different testing scenarios. The test depicted in FIGS. 5 and 6 which establish paths in FIG. 5 through the channel unit 42 and through the entire system in FIG. 6 are only two of many different testing combinations of equipment which one skilled in the art would appreciate.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A test access system in a digital loop carrier communication system having at least first and second terminals connected by a digital transmission line, each of said first and second terminals having a plurality of analog ports for analog signals and each of said first and second terminals having at least one digital port connected to said digital transmission line for digital signals, each of said first and second terminals having a plurality of channel units having first ports and a second port, said first ports connected to said analog ports, respectively, and at least one digital interface unit having a first port connected to said second port of said channel units and a second port connected to said digital port, comprising:

a channel diagnostic unit connected via a first bus to each of said analog ports and said first ports of said channel units and connected via a second bus to said first port of said digital interface unit;

a system access unit connected via said first bus to each of said analog ports and said first ports of said channel units and connected via said second bus to said first port of said digital interface unit; and said channel diagnostic unit at least establishing a signal path and said system access unit at least providing for monitoring and/or insertion of test signals on said signal path.

2. The test access system according to claim 1 wherein said channel diagnostic unit and said system access unit have means for switching signal lines in said first and second buses to establish said signal test path.

3. The test access system according to claim 2 wherein said signal test path extends from said channel diagnostic unit through a selected channel unit and said digital interface unit back to said channel diagnostic unit.

4. The test access system according to claim 2 wherein each of said first and second terminals have substantially similarly configured channel units, digital interface units, channel diagnostic units and system access units, and wherein said signal test path extends from an analog port, through a system access unit, a selected channel unit and a digital interface unit of said first terminal, via said digital transmission line to a digital interface unit, a selected channel unit, a system access unit and an analog port of said second terminal.

5. The test access system according to claim 4 wherein at least one of said system access unit and said channel diagnostic unit of said first terminal communicates with at least one of said system access unit and said channel diagnostic unit of said second terminal.

6. A test access system in a digital loop carrier communication system having at least first and second terminals connected by a digital transmission line, each of said first and second terminals having a plurality of analog ports for analog signals and each of said first and second terminals having at least one digital port connected to said digital transmission line for digital signals, each of said first and second terminals having a plurality of channel units having first ports and a second port, said first ports connected to said analog ports, respectively, and at least one digital interface unit having a first port connected to said second port of said channel units and a second port connected to said digital port, comprising:

a channel diagnostic unit connected via a first bus to each of said analog ports and said first ports of said channel units and connected via a second bus to said first port of said digital interface unit;

a system access unit connected via said first bus to each of said analog ports and said first ports of said channel units and connected via said second bus to said first port of said digital interface unit;

said channel diagnostic unit at least selecting a signal test path and said system access unit at least provides for monitoring and/or insertion of test signals on said signal test path; and said channel diagnostic unit and said system access unit having means for switching signal lines in said first and second buses to establish said signal test path.

7. The test access system according to claim 6 wherein said signal test path extends from said channel diagnostic unit through a selected channel unit and said digital interface unit back to said channel diagnostic unit.

8. The test access system according to claim 6 wherein each of said first and second terminals have substantially similarly configured channel units, digital interface units, channel diagnostic units an system access units, and wherein said signal test path extends from an analog port, through a system access unit, a selected channel unit and a digital interface unit of said first terminal, via said digital transmission line to a digital interface unit, a selected channel unit, a system access unit and an analog port of said second terminal.

9. The test access system according to claim 8 wherein at least one of said system access unit and said channel diagnostic unit of said first terminal communicates with at least one of said system access unit and said channel diagnostic unit of said second terminal.

10. A test access system in a digital loop carrier communication system having at least first and second terminals connected by a digital transmission line, each of said first and second terminals having a plurality of analog ports for analog signals each of said first and second terminals having and at least one digital port connected to said digital transmission line for digital signals, each of said first and second terminals having a plurality of channel units having first ports and a second port, said first ports connected to said analog ports, respectively, and at least one digital interface unit having a first port connected to said second port of said channel units and a second port connected to said digital port, comprising:

means for establishing at least a signal test path connected via a first bus to each of said analog ports and said first ports of said channel units and connected via a second bus to said first port of said digital interface unit;

means for monitoring connected via said first bus to each of said analog ports and said first ports of said channel units and connected via said second bus to said first port of said digital interface unit; and said means for monitoring also having means for insertion of test signals on said signal test path.

11. The test access system according to claim 10 wherein said means for monitoring and said means for establishing a signal test path have means for switching signal lines in said first and second buses to establish said signal test path.

12. The test access system according to claim 10 wherein said means for establishing at least a signal test path in a channel diagnostic unit and said means for monitoring is a system access unit.

13. The test access system according to claim 12 wherein said signal test path extends from said channel diagnostic unit through a selected channel unit and said digital interface unit back to said channel diagnostic unit.

14. The test access system according to claim 12 wherein each of said first and second terminals have substantially similarly configured channel units, digital interface units, channel diagnostic units and system access units, and wherein said signal test path extends from an analog port, through a system access unit, a selected channel unit and a digital interface unit of said first terminal, via said digital transmission line to a digital interface unit, a selected channel unit, a system access unit and an analog port of said second terminal.

15. The test access system according to claim 14 wherein at least one of said system access unit and said channel diagnostic unit of said first terminal communicates with at least one of said system access unit and said channel diagnostic unit of said second terminal.

* * * * *